Sept. 1, 1953  I. V. BRUMBAUGH  2,650,614
GRADUATED UNIVERSAL VALVE FOR GAS APPLIANCES
WITH INTERCONNECTED SLEEVE
Filed Sept. 29, 1947  2 Sheets-Sheet 1

INVENTOR.
ISAAC VERNON BRUMBAUGH
BY
Jerome R. Cox
HIS ATTORNEY

Sept. 1, 1953  I. V. BRUMBAUGH  2,650,614
GRADUATED UNIVERSAL VALVE FOR GAS APPLIANCES
WITH INTERCONNECTED SLEEVE
Filed Sept. 29, 1947  2 Sheets-Sheet 2
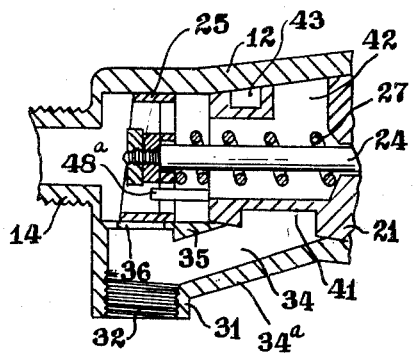
Fig. 6.
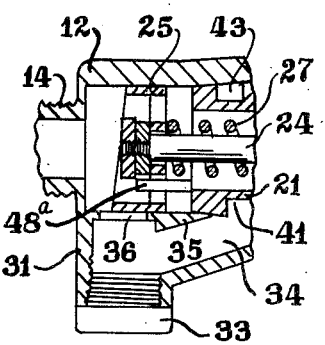
Fig. 7.
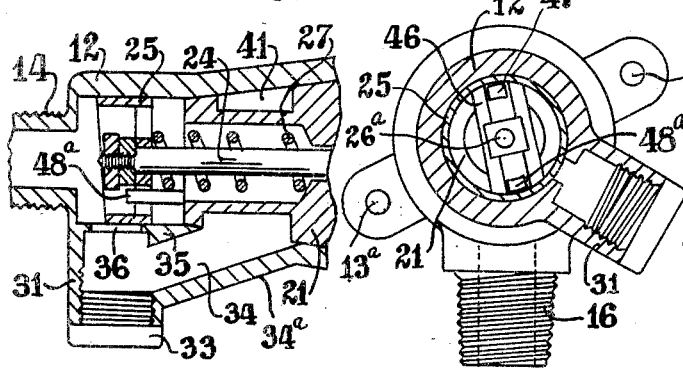
Fig. 8.  Fig. 9.  Fig. 10.
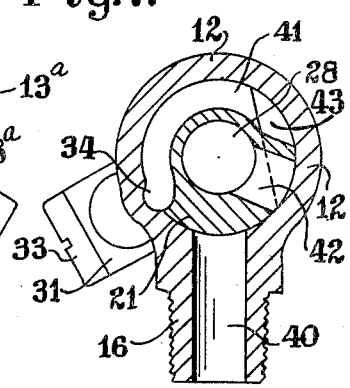
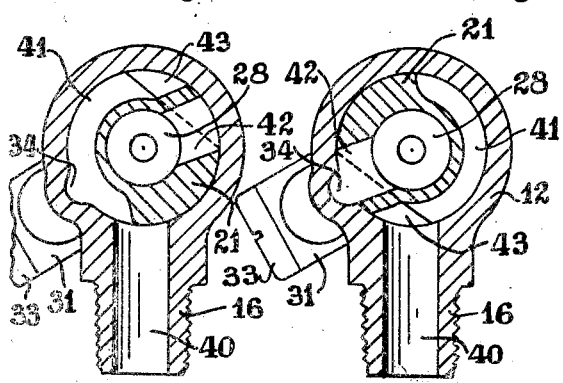
Fig. 11.  Fig. 12.
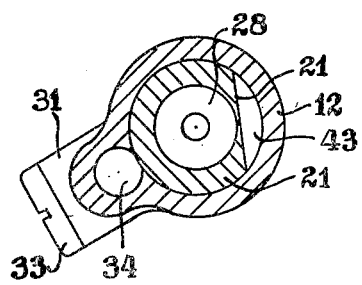
Fig. 13.
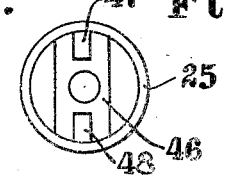
Fig. 14.
INVENTOR.
ISAAC VERNON BRUMBAUGH
BY Jerome R. Cox
HIS ATTORNEY Patented Sept. 1, 1953

2,650,614

UNITED STATES PATENT OFFICE 2,650,614

GRADUATED UNIVERSAL VALVE FOR GAS APPLIANCES WITH INTERCONNECTED SLEEVE

Isaac Vernon Brumbaugh, Clayton, Mo.

Application September 29, 1947, Serial No. 776,687

15 Claims. (Cl. 137—637.4)

The inventions disclosed in this application relate to valves. They are illustrated by a valve which is especially designed for use in controlling a top burner of a kitchen cooking range but it is to be understood the inventions involved clearly have other uses. Thus the inventions involved are also useful in the control of gas oven burners. They may be used for control of gas outside of the cooking field. They may even be used for the control of other fluids. The valve illustrated is designed so that not only may the gas be turned on and off but also the control for the valve may be rotated from the "on" position so that the size of the flame may be regulated. For example, as illustrated the size of the gas flame may be decreased in a uniform gradual manner down to a condition in which the flame will provide only enough heat to cause the material being cooked to boil gently or simmer.

If desired I may modify the design in an obvious manner to provide similar valves in which the flow of gas may be increased gradually from the closed or off position through a minimum lighting position and gradually increasing through an infinite number of positions to a maximum flame or "on" position.

Prior hereto valves (especially valves for controlling the top burners of cooking ranges) have been usually designed with a single port or with a plurality of different sizes ports through which gas may flow. All or substantially all such valves have an open and a closed position. Many have an "open," a "simmer" and a "closed" position. Some have an "open," a "closed," a "medium," and a "simmer" position.

Usually even where a single port is provided, the flame may be adjusted because as the valve is moved to closed position, the two cooperating openings through which the gas flows, are moved relative to each other to constrict the flow of the gas. However, such adjustment of the flame is difficult and indefinite.

My inventions are especially important where used in connection with a gas having a high heating value (i. e. high B. t. u. rating) such as the liquid petroleum gases—butane and propane. With such gases it is especially difficult with a single port to obtain a simmer flame without inadvertently extinguishing the flame entirely.

So valves have been designed with a plurality of ports. Usually such valves (as well as the single port valves) are only satisfactory for one particular kind of gas (i. e. one having a certain B. t. u. value) and then only when the B. t. u. value of that gas remains constant. It is of course well known that several different kinds of gas having different heating values, specific gravities, and distribution pressures are supplied to users in different parts of the country and sometimes different kinds are supplied to different users in the same community. The following table gives the approximate statistics for various types of gas and illustrates the wide differences in these important characteristics thereof.

| Kind of gas | Heating value (B. t. u.) | Specific Gravity Air=1.0 | Distribution pressure (inches of water) |
|---|---|---|---|
| Manufactured | 500–600 | .35–.65 | 3–8 |
| Mixed Natural and manufactured | 800 | .50–.60 | 4–8 |
| Natural | 950–1,200 | .60–.70 | 3–10 |
| Liquefied Petroleum: | | | |
| propane | 2,500 | 1.5 | 11.0 |
| butane | 3,200 | 1.95 | 11.0 |
| Liquefied Petroleum mixed with air | 550–1,700 | 1.15–1.5 | 3–10 |

Not only the B. t. u. value of the gas, but also the specific gravity thereof and the distribution pressure under which it is supplied affect the adjustment of the valve. Wherever used hereafter in this specification and claims I intend the words "heating value" and "heat value" to be construed to mean heating value, specific gravity of gas and/or distribution pressure thereof, etc.

One of the objects of my invention is the provision of a gas valve provided with means for adjusting the size of the gas passages for gas of different heating value and with means for regulating the flow of gas to increase or decrease the size of the flame and therefore control the heat being provided.

A further object is the provision of a gas valve provided with a gas control member which is movable longitudinally of the casing for adjustment to compensate for the heat value of the gas being supplied and is rotatable to cause an increase or decrease in the size of the flame as may be desired by the user for particular purposes.

A further object of my invention is the provision of a valve having a piston element or other camlike member formed with an eccentric surface or edge which cooperates with a gas port whereby either rotation of the piston element or movement longitudinally of the piston element will vary the effective size of the gas port.

A further object of the invention is the provision of a gas cock plug having a plurality of passages therethrough, one of which is of substantially uniform size and through which the gas passes to the burner when the valve is turned to the full on position and another of which is of substantially infinitely variable size and through which the gas passes to the burner for lower flames.

A further object of my invention is the provision in a valve of the character described of a port having a variable width which cooperates with an eccentric element passing over the face of the port and adapted to cover a greater or lesser length of the port as may be desired.

Features of the invention include a tapered port having arcual sides which cooperates with a sleeve or cam having a sloping edge whereby adjustment of the sleeve longitudinally covers and uncovers more or less of the tapered port and whereby rotation of the sleeve also is adapted to cover or uncover more or less of the port; a gas valve having a rotor cock member for cutting off completely the supply of gas and for turning on the supply of gas, connected to a concentric sleeve which is rotatable for the purpose of increasing or decreasing the size of the passage through which the gas passes to the burner; and a plug element provided with a passage extending through the hollow center thereof for allowing the passage of a full volume of gas to the burner and also provided with a circumferential groove by which gas may be by-passed around the circumference of the plug to an adjustable port for providing a slow adjustment of the flame.

Further objects, features and advantages of the invention should be apparent from the following specification and claims when considered in connection with the accompanying drawings illustrating an embodiment of my invention.

In the drawings:

Figure 6 is a fragmentary view in section taken on a plane approximately 30° from the horizontal (i. e. 6—6 of Fig. 4) and on a larger scale than the scale of Fig. 5 and showing the position of the valve parts when the valve is adjusted for a minimum flame or simmer position with a gas of high heating value;

Figure 7 is a view similar to Fig. 6 but showing the approximate simmer position of the valve when it is adjusted for a gas of lower heating value;

Figure 8 is a view similar to Figs. 6 and 7 but showing the position of the valve parts when the valve is adjusted for a gas having a high heating value and is turned slightly beyond the "seven" position of the valve, thus giving a relatively high flame without being at the full "on" position;

Figure 9 is a view in vertical section of the valve taken substantially on the line 9—9 of Fig. 1;

Figure 10 is a view in vertical section taken substantially on the line 10—10 of Fig. 1 and showing the valve parts in the position which they occupy when the plug is in the "off" position;

Figure 11 is a view in vertical section taken substantially on the line 10—10 of Fig. 1 but showing the valve parts in the position of the plug when the piston is at the simmer setting according to the knob or operating dial;

Figure 12 is a view in vertical section taken substantially on the line 10—10 of Fig. 1 showing the position of the valve parts when the valve is turned to a position approaching the "on" position;

Figure 13 is a view in section taken substantially on the line 13—13 of Fig. 1 with the valve parts in the closed position of the valve; and Figure 14 is a view in end elevation of the sleeve or piston which cooperates with the tapered port to regulate the variable flow of gas in the operation of my improved valve.

Figure 1:
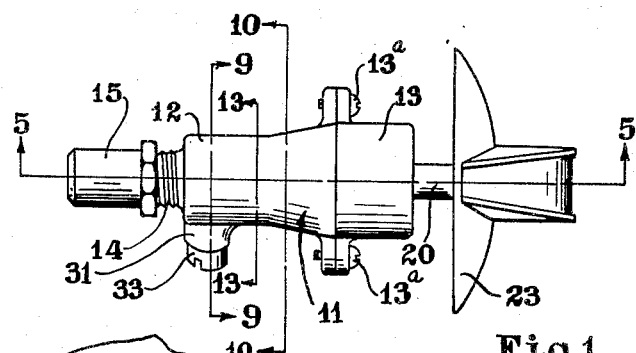
Figure 1 is a top plan view of a valve illustrating my invention.
Figure 5:
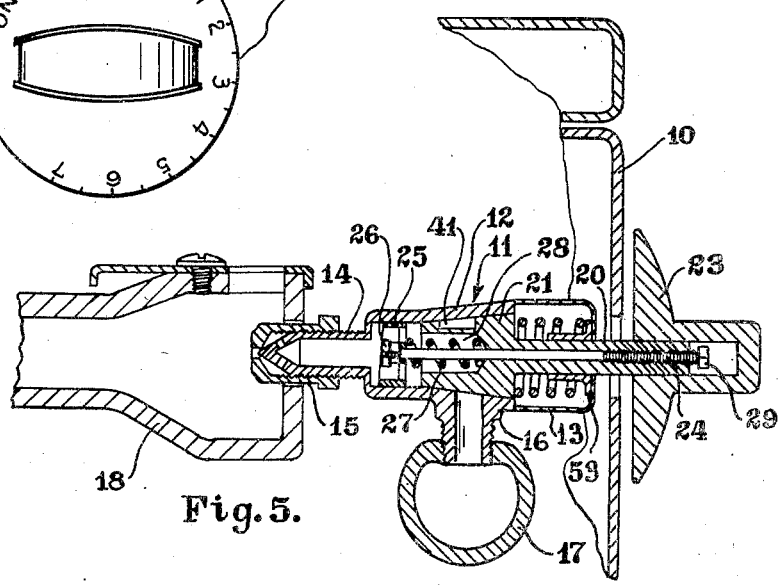
Figure 5 is a view in vertical section of the valve taken as if on the line 5—5 of Fig. 1 wherein the valve is shown associated with the front plate of a range and with a portion of one of the mixing tubes of one of the top burners of the range and wherein the valve is shown secured to a gas manifold.

Referring especially to Figures 1 and 5 it may be seen that I have illustrated a gas cock valve 11 associated with the front plate 10 of a cooking range. The valve has a main casing 12 and a supplementary cover 13. Formed on the rearward end of the casing 12 is a threaded projection 14 onto which there is screwed an orifice cap 15. The casing 12 is also formed with a downwardly extending threaded boss 16 which is adapted to be threaded into a gas manifold 17. The orifice cap 15 is adapted to be extended into the end of a mixing tube 18. Positioned in the casing 12 is a valve plug 21 having a forwardly extending stem 20 onto which there is secured a knob or operating dial 23. The valve plug 21 is axially bored and has extending through this axial bore an adjustment rod 24 which has connected to it at its rearward end a sleeve or piston 25. The sleeve or piston 25 is actually slidably mounted on the rearward end of the rod 24 and bears on one or more nuts 26 screwed onto the end of the rod 24. It is maintained resiliently in contact with the nuts 26, by a spring 27. The spring 27 seats at its front end in a pocket 28 formed in the valve plug 21. The rod 24 is adjustably threaded in the axial bore of the plug 21 and has on its forward end a head 29 by which it may be screwed into or out of said bore so as to adjust the position of the sleeve 25 relative to the valve plug 21.

Figures 3, 4:
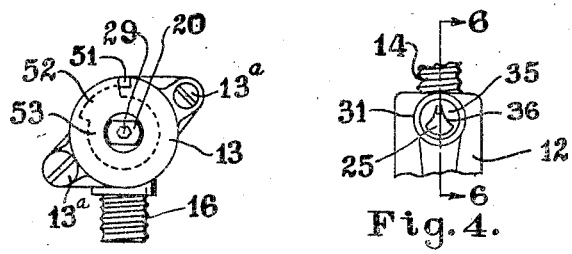
Figure 3 is a view in elevation looking at the valve from the same direction as in Figure 2 but having the knob or operating dial removed.
Figure 4 is a fragmentary view of a portion of the valve as if in side elevation but looking at the valve at an angle of approximately 30° from the horizontal, a plug cap having been removed in order to show the shape of the metering port.

Inasmuch as the sleeve 25 performs an important function in connection with my invention its construction should be especially noted and it should be noted that the rearward end thereof is cut on a bias or sloped so that one portion of the circumference extends farther inward or rearward within the casing 12 than do other portions thereof. This bias cut sleeve 25 cooperates with a tapered opening 36 which may best be explained by reference to Figure 4. By reference thereto it is to be noted that sides of the opening 36 are formed as arcs rather than as straight lines. Referring to Figure 6 it may be seen that the casing 12 is formed with a tubular projection 31 having an opening 32 which is normally closed during operation by a plug cap 33 (Fig. 1). As will be subsequently explained, the interior of the projection 31 is at times connected with a source of supply of gas as by a passage 34 formed in a sloping projection 34ª. A partition 35 formed within the casing 12 (see Figs. 4 and 6) is formed with the tapered arcual opening 36 through which gas at times flows to the burner 18. The sleeve 25 cooperates with this tapered arcual opening 36 and depending on the longitudinal and rotative position of the sleeve 25 uncovers more or less of the opening so that the amount of gas which flows through the opening may be accurately adjusted and regulated.

The manner in which the gas may flow from the manifold 17 through the valve to the tube 18 when it is desired to have a flame at the burner and by which the flow of gas may be cut off when desired should now be explained. The valve plug 21 is formed with the pocket 28. It is also, in the plane of the line 10—10, formed with a circumferential groove 41 and with a radial bore 42 leading from the circumference of the plug to the pocket 28. It is also formed (as is shown partly in dotted lines in Figures 10–12 inclusive but as is shown most clearly in Fig. 13) in the plane of the line 13—13 with a groove 43 arranged at times to connect the groove 41 with the bore 42. When the valve is in the position of Fig. 10, no gas may flow from the passageway 40 in the boss 16 either into the pocket 28 or into the grooves 41 and 43 and thus there can be no flame. When however, the valve is turned to the position of Fig. 11 gas may flow through the groove 41, the passage 34, and the port 36 to the interior of the projection 14 and thence to the tube 18. So also as rotation is continued until the position of Fig. 12 is approached. Then gas may not flow through groove 41 directly to passage 34, but may flow through groove 41 and groove 43 not only to passage 34 but also to bore 42. From bore 42 it flows in full stream into pocket 28 and thence to the interior of projection 14. Continued counterclockwise rotation from the position of Fig. 12 connects the passageway 40 in the boss 16 directly with the bore 42.

Referring now to Fig. 9 and to Fig. 14 it may be seen that the sleeve 25 has secured thereto or formed therewith an eccentrically positioned H-shaped supporting member 46 having slots 47 and 48 through which extend (Fig. 9) fingers 47ª and 48ª formed as extensions of the valve plug 21. Thus rotation of the valve plug 21 by means of the fingers 47ª and 48ª and the H-shaped member 46 rotates the sleeve 25 to effect adjustment of effective size the triangular appearing metering port 36 as the valve is turned and as the sloping face of the sleeve 25 moves over the port.

Figure 2:
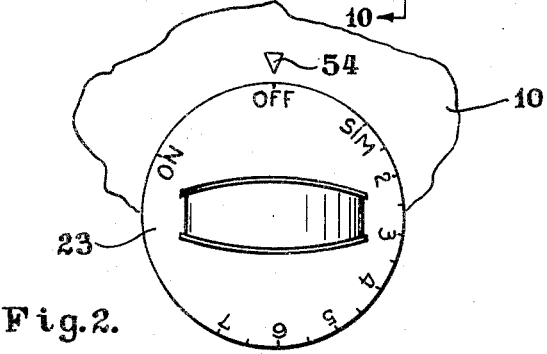
Figure 2 is a view in elevation of the valve of Figure 1 as it appears looking from the front with a fragment of the range panel added.

The knob 23 is (as may be seen by referring to Fig. 2) provided with markings to indicate the "off" position of the valve, the "on" position of the valve, the "simmer" position thereof, and graduated positions to indicate intermediate higher flames in the order of the numbers as shown. A pointer 54 on the plate 10 cooperates therewith.

The operation of my improved valve is as follows:

In the "off" position (as shown in Figs. 10 and 13) no gas can flow from the passageway 40 into the interior of the casing 12. As the valve plug 21 is turned in a counterclockwise direction (referring to Figs. 10–12 incl.) the bore 42 eventually becomes aligned with the passageway 40 and a full supply of gas flows from the passageway 40 to bore 42, the pocket 28, the interior of the projection 14, the orifice cap 15, and into the mixing tube 18. In this open position of the valve, the gas is automatically lighted, where flash tube lighting is provided, or may be lighted in any other convenient manner. The valve may be left in such position to secure a maximum flame or may then be turned clockwise to any operative position including those shown in Figures 11 and 12. In the position of Fig. 12 the flow of gas is cut off from direct flow into the bore 42 but it may pass through the slot or groove 43 into the bore 42 and pocket 28. It may also pass into the passage 34 and thence through the continuation of the passage 34 in the projection 31 through the arcual tapered metering port 36, into the interior of the casing 12 and thence through the projection 14 and the orifice cap 15 into the mixing tube 18. As shown, the position of the valve plug 21 in Fig. 12 corresponds substantially to a position of the valve plug which is between the full "on" position and the position shown in Fig. 8. In the position of Fig. 12 substantially a maximum supply of gas may flow through the arcual tapered metering port 36 into the burner. But this is immaterial for the reason that substantially a full flow of gas goes through the port 42 and pocket 28. Continued rotation of the plug in a clockwise direction moves the valve gradually to positions in which the groove 43 is blocked off and the gas flows through the arcual tapered metering port 36 into the interior of the casing and thence to the burner. As the plug is moved from the position shown in Fig. 12 toward the position of Fig. 11 the groove 43 moves out of registration with the passageway 40 but before it does so the groove 41 registers with the passage 34 and during all this part of the movement, gas may flow from the passageway 40 through the groove 41, and thence through passageway 34. During this movement (from the positions of Fig. 12 to Fig. 11) the sleeve 25 is rotated by the fingers 47ª and 48ª to restrict the port 36. Thus the operating dial 23 (Fig. 2) is turned first in counterclockwise direction to move the valve to the "on" position at which time the burner is usually automatically lighted. Thence the operating dial is turned clockwise through an infinitely gradual turn-down so that the gas may be regulated exactly as desired until the simmer position (Fig. 6 or Fig. 7) is reached. In this turn-down operation the position shown in Fig. 8 is reached soon after the position of Fig. 12 is passed (in a clockwise direction). In this position of Fig. 8, the port 36 is uncovered to substantially its maximum extent for that longitudinal setting of the sleeve 25.

A stop 51 is provided in the casing 13 which cooperates with a stop 52 formed on sleeve 53 to prevent turning the operating dial 23 clockwise farther than the "off" position or counterclockwise farther than the "on" position. In order to adjust the valve for different types of gas, the knob 23 is removed, and the rod 24 is screwed further forward (out of) or rearward (into) within the axial bore of the plug 21 to pull the sleeve 25 forward thus increasing the effective size of the port 36, or to allow the spring 27 to move the sleeve rearward. This adjustment is made at the simmer position of the valve (i. e. that shown in Figs. 6 and 7). Then after adjustment the knob 23 is replaced. Thereafter rotation of the knob 23 to positions "2," "3," etc., increases the size of the flame gradually as desired. Any subsequent movement of the knob to the simmer position adjusts the flow of gas exactly to produce a simmer flame. Also adjustment of the valve to the other marked positions always adjusts the flow of gas to produce the desired and indicated flame.

By reversal of the machining of the plug 21; by suitable modification of the positions of the stops and the markings on the dial; or by other obvious modifications as desired I can modify the structure so that (1) the operating dial turns in a clockwise direction from "off" to "on," to "7," to "6," to "5," to "4," to "3," to "2" and to "simmer" positions; (2) the operating dial turns clockwise from "off" to "simmer," to "2," to "3," to "4," to "5," to "6," to "7," and to "on" positions; or (3) the operating dial turns counterclockwise from "off" to "on," to "7," to "6," to "5," to "4," to "3," to "2," to "simmer" positions.

The embodiments of the valve disclosed herein are also shown in my application Serial No. 66,710, filed December 22, 1948, which is intended to include claims generic to the inventions disclosed herein. Said application Serial No. 66,710 also discloses embodiments of my invention disclosed in my application Serial No. 6,719, filed February 5, 1948, and in my application Serial No. 27,167, filed May 15, 1948.

It is to be understood that the above described embodiment of my invention is for the purpose of illustration only and various changes may be made therein without departing from the spirit of my invention.

I claim:

1. A valve comprising a casing having an inlet port and an outlet port; a rotor plug therein having passages formed therethrough through which fluid may flow from the inlet port to the outlet port; means for turning said plug; and separate means comprising a member spaced longitudinally of but associated with said plug and a separate bypass controlled by said spaced member for increasing gradually the amount of flow of fluid through said valve as the plug is rotated in one direction and for decreasing the amount of flow of fluid through said valve as the plug is rotated in the opposite direction.

2. A valve comprising a casing having an inlet port and an outlet port; a rotating valve member therein having passages formed therethrough through which fluid may at times flow from the inlet port to the outlet port; means for rotating said rotating valve member to position said valve member selectively either in a position at which fluid may not flow or in positions at which fluid may flow; a separate member spaced longitudinally of but associated with said rotating valve member and turned by said rotating means simultaneously with said rotating valve member and a separate bypass controlled by said separate spaced member for increasing gradually the amount of flow of fluid through said valve as the separate member is rotated in one direction and for decreasing the amount of flow of fluid gradually as the separate member is rotated in the opposite direction; and means for moving one of said members relative to the other in one direction to increase the amount of fluid flowing through said valve for any rotative position of the rotating valve member and for moving it in the opposite direction to decrease the amount of fluid flowing through said valve for any rotative position of the rotating valve member.

3. A valve comprising a casing having an inlet port and an outlet port; a rotating valve member therein having passes formed therethrough through which fluid may at times flow from the inlet port to the outlet port; means for rotating said rotating valve member selectively either to a position at which fluid may not flow or to positions at which fluid may flow; and a separate member associated with said rotating valve member spaced longitudinally of but and turned by said rotating means simultaneously with said rotating valve member and a separate bypass controlled by said separate spaced member for increasing gradually the amount of flow of fluid through said valve as the separate member is rotated in one direction and for decreasing the amount of flow of fluid gradually as the separate member is rotated in the opposite direction.

4. A valve comprising a casing having a partition formed with a port, having an inlet port at times connected to an inlet space formed on one side of said partition, and having an outlet port connected to an outlet space on the opposite side of said partition; means for connecting said inlet port to, and disconnecting said inlet port from, said inlet space comprising a plug in said casing; and a sleeve associated with and at times covering portions of said partition port, said sleeve being associated with, concentric with, and rotated by said plug, and having a surface formed with a sloping edge so that rotation of said sleeve over said partition port increases or decreases the effective size of said partition port.

5. A valve comprising a casing having a partition formed with a port, having an inlet port at times connected to an inlet space formed on one side of said partition, and having an outlet port connected to an outlet space on the opposite side of said partition; means for connecting said inlet port to, and disconnecting said inlet port from, said inlet space comprising a plug in said casing; a sleeve associated with and at times covering portions of said partition port, said sleeve being associated with, concentric with, and rotated by said plug, and having a surface formed with a sloping edge so that rotation of said sleeve over said partition port increases or decreases the effective size of said partition port; and means for adjusting the position of said sleeve relative to said plug for changing the several effective sizes of said partition port corresponding to various rotative positions of said plug to compensate for the heat value of the gas for which the valve is being adjusted.

6. A valve comprising a casing having a partition formed with a port, having an inlet port at times connected to an inlet space formed on one side of said partition and having an outlet port connected at all times to an outlet space on the opposite side of said partition; means for connecting said inlet port at times to, and for disconnecting said inlet port at other times from, said inlet space comprising a rotative plug positioned in said casing; a sleeve having a sloping surface at times covering a portion of said partition port; a connection between said plug and said sleeve whereby rotation of said plug rotates said sleeve relative to said partition port and whereby the portion of the partition port covered thereby is decreased or increased; and means for varying the distance between said plug and said sleeve, whereby the portion of the partition port covered by said sleeve may also be decreased or increased.

7. A valve comprising a casing having a partition formed with a port, having an inlet port at times connected to an inlet space formed on one side of said partition and having an outlet port connected at all times to an outlet space on the opposite side of said partition; means for connecting said inlet port at times to, and for disconnecting said inlet port at other times from, said inlet space comprising a rotative plug positioned in said casing; a sleeve having a sloping surface at times covering a portion of said partition port; a connection between said plug and said sleeve whereby rotation of said plug rotates said sleeve relative to said partition port and whereby the portion of the partition port covered thereby is decreased or increased; and means for varying the distance between said plug and said sleeve, comprising a rod extended through and adjustably threaded into an axial bore formed in said plug, a nut secured to an end of said rod on which said sleeve bears, and a spring interposed between said plug and said sleeve whereby the portion of the partition port covered by said sleeve may also be decreased or increased.

8. In a valve, a rotatable cylindrical sleeve rotatable about the longitudinal axis of the valve member; a non rotatable cylindrical member associated therewith so that one of said members surrounds the other; one of said members being formed with a tapered port narrower at one end longitudinally of the valve than at the other and the other member having a surface sloped with respect to the longitudinal axis of the valve member and extending a substantial distance around said circumference and contacting with said port so as to vary infinitely throughout its range the effective size of said port depending on the rotative position of the sleeve member, and one of said members being movable longitudinally; a screw connected to said longitudinally movable member and limiting the movement of said longitudinally movable member longitudinally of the valve; and a spring for urging said longitudinally movable member into contact with said screw for varying the effective size of the port for each rotative position of the sleeve member.

9. A valve comprising a casing having an inlet and an outlet and formed with a hollow which is cylindrical for a portion of its length and is frustoconical for another portion of its length, a plug seated in said frustoconical portion of the hollow, a hollow open ended sleeve positioned within said cylindrical portion of the hollow having its open end connected to the outlet, means for connecting said sleeve to said plug and for rotating said sleeve simultaneously with said plug, and means for moving said sleeve longitudinally relative to said plug.

10. A valve comprising a casing having an inlet opening, an outlet opening, and a fixed bypass port; a rotor plug therein formed with a central pocket and an opening leading from the pocket to the surface thereof in such position that it registers at times with said inlet port and at times is out of registry therewith; and a separate member spaced longitudinally of said plug, secured thereto and rotated thereby for controlling the flow of liquid through said fixed bypass port.

11. A valve comprising a casing having a partition formed with a port, having an inlet port at times connected to an inlet space formed on one side of said partition, and having an outlet port connected to an outlet space on the opposite side of said partition; means for connecting said inlet port to, and disconnecting said inlet port from, said inlet space comprising a plug in said casing; and a sleeve associated with and at times covering portions of said partition port, said sleeve being associated with, concentric with, and rotated by said plug.

12. A valve comprising a casing having a partition formed with a port, having an inlet port at times connected to an inlet space formed on one side of said partition, and having an outlet port connected to an outlet space on the opposite side of said partition; means for connecting said inlet port to and disconnecting said inlet port from, said inlet space comprising a plug in said casing; a sleeve associated with and at times covering portions of said partition port, said sleeve being associated with, concentric with, and rotated by said plug; and means for adjusting the position of said sleeve relative to said plug for changing the several effective sizes of said partition port corresponding to various rotative positions of said plug to compensate for the heat value of the gas for which the valve is being adjusted.

13. A valve comprising a casing having an inlet passage connected to an inlet port, an outlet passage connected to an outlet port and a separate passage connected to a bypass port; a rotor plug therein controlling said inlet port; and a separate sleeve member spaced longitudinally of said plug so it is concentric therewith and secured thereto and is rotated thereby for controlling the flow of liquid through said bypass port.

14. A valve comprising a casing having an inlet port and an outlet port; a rotor plug therein formed with a central pocket and an opening leading from the pocket to the surface thereof and the plug being also formed with a pair of grooves formed on the surface thereof of which one groove is arranged to register at times with said inlet port, and extends circumferentially of the plug more than 180° so that said inlet port is connected to the outlet port through a cycle of more than one half the rotation of said plug and of which the other groove is arranged at times to register with said inlet port.

15. The structure of claim 1 in which the casing has a hollow; in which the longitudinally spaced member is positioned within the hollow; and in which there is provided means for connecting said member to said plug and for rotating said member simultaneously with said plug, and for preventing rotation of the member relative to the plug, and means for moving said member longitudinally relative to said casing and to said plug.

ISAAC VERNON BRUMBAUGH.

References Cited in the file of this patent

UNITED STATES PATENTS

| Number | Name | Date |
|---|---|---|
| 375,508 | Rodman | Dec. 27, 1887 |
| 1,127,822 | Sturtevant | Feb. 9, 1915 |
| 1,175,881 | Creelman | Mar. 14, 1916 |
| 1,947,637 | Bolster | Feb. 20, 1934 |
| 2,140,292 | Jensen | Dec. 13, 1938 |
| 2,257,886 | Mueller | Oct. 7, 1941 |
| 2,288,913 | Moecker | July 7, 1942 |
| 2,384,078 | Curtis | Sept. 4, 1945 |
| 2,484,916 | Tucker | Oct. 18, 1949 |

FOREIGN PATENTS

| Number | Country | Date |
|---|---|---|
| 220,525 | Great Britain | of 1924 |
| 411,888 | France | of 1910 |
| 464,003 | Great Britain | of 1937 |
| 609,128 | Germany | of 1935 |